Jan. 7, 1930.     D. E. WILKINSON     1,742,741
THRUST BEARING
Filed April 28, 1928     2 Sheets-Sheet 1

Inventor
D. E. Wilkinson
By Clarence A. O'Brien
Attorney

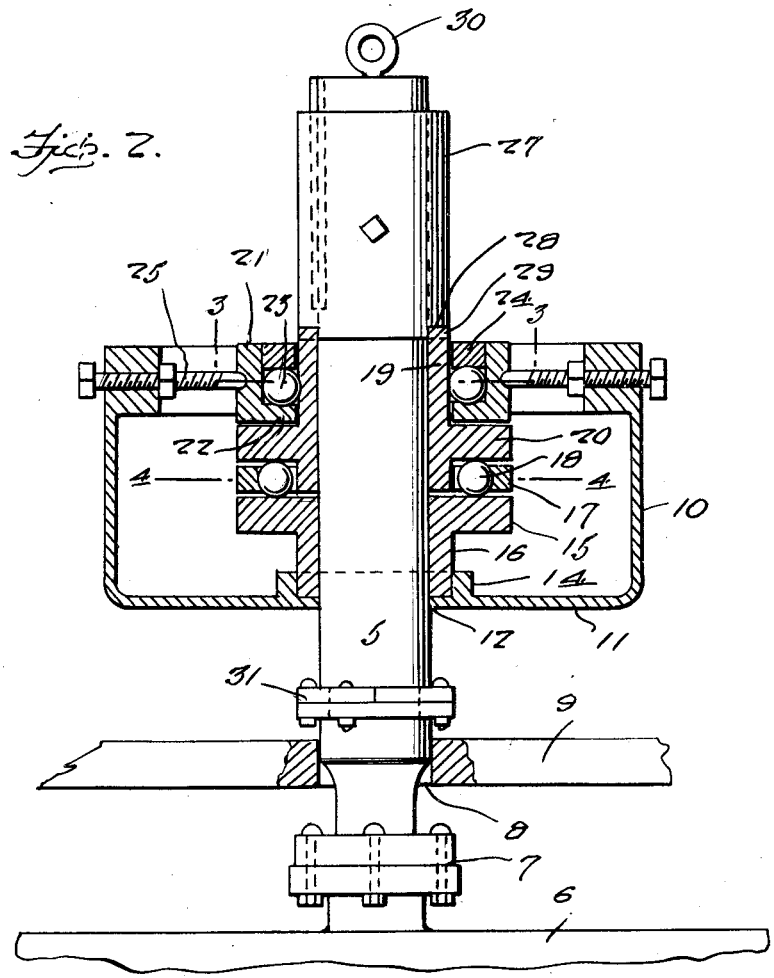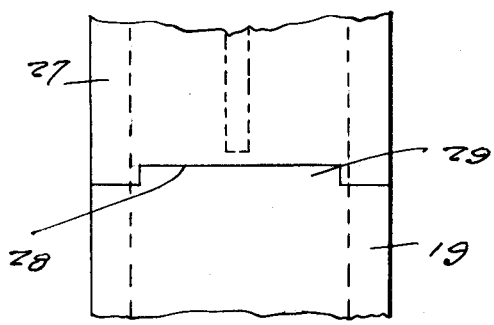

UNITED STATES PATENT OFFICE

DORSEY E. WILKINSON, OF RICHMOND, VIRGINIA

THRUST BEARING

Application filed April 28, 1928. Serial No. 273,569.

The present invention relates to a thrust bearing for a vertical shaft and has for its prime object to provide a simple, yet sturdy structure which is thoroughly efficient and reliable in operation.

With the above and numerous other objects in view as will appear as the description proceeds, the invention resides in certain novel features of construction, and in the combination and arrangement of parts as will be hereinafter more fully described and claimed.

In the drawings:

Figure 2 is a vertical section therethrough,

Figure 5 is a fragmentary elevation of a thrust bearing and sleeve.

Figure 1:
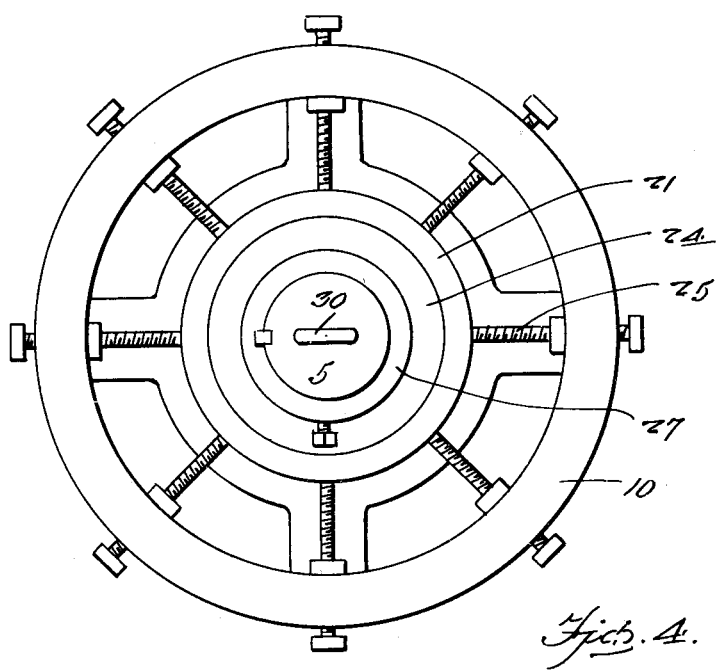
Figure 1 is a top plan view of an assembly of my invention.
Figures 3, 4:
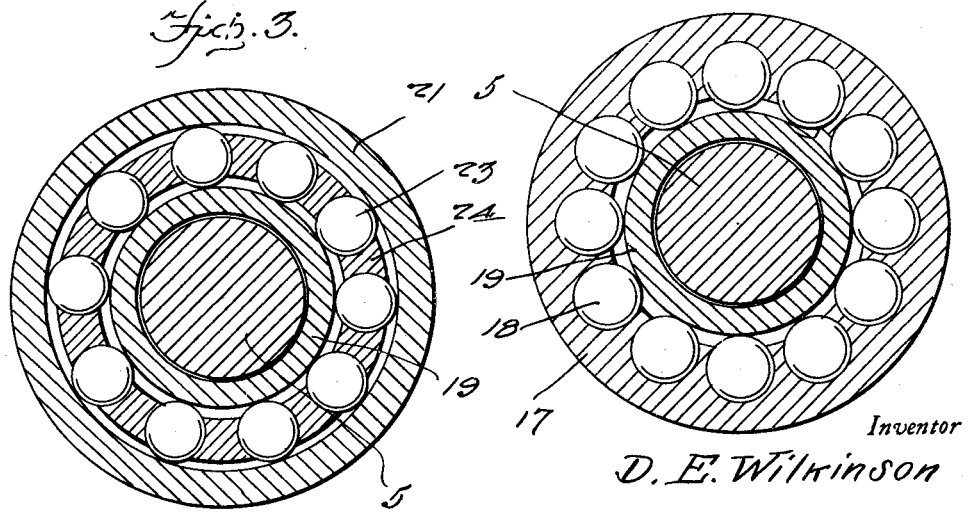
Figure 3 is a horizontal transverse section taken substantially on the line 3—3 of Figure 2.
Figure 4 is a similar section taken on the line 4—4 of Figure 3.

Referring to the drawing in detail it will be seen that the numeral 5 denotes a vertical shaft which may have a water wheel 6 at the lower end thereof or any other suitable source of power coupled thereto as is indicated by coupling 7.

The shaft 5 extends through an opening 8 in a suitable frame 9. A casing 10 includes a cylindrical side wall and a bottom 11 with an opening therein as at 12 through which the shaft 5 extends. Rising from the bottom 11 about the opening 12 is an annular flange 14. An annular bearing member 15 is provided with a hub portion 16 disposed about the shaft 5 and extending within the flange 14.

A retainer 17 has a plurality of anti-friction balls 18 mounted therein bearing against the bearing member 15. A sleeve 19 is disposed about the shaft 5 and has an annular flange 20 intermediate its ends and resting on the balls 18.

An annular member 21 is disposed about the sleeve 19 and has an inwardly directed flange 22 at its lower edge supporting balls 23 over which are disposed retainers 24. The bearing member 21 is supported by a plurality of bolts 25 adjustably mounted in the upper portion of the cylindrical wall of the casing 10 so that the bearing structure may be properly centered.

A sleeve 27 is keyed on the upper end of the shaft and has notches 28 to receive projections 29 from the sleeve 19 so that the sleeve 19 will rotate with the shaft 5 when the shaft is in a position shown in Figure 2. However the shaft may be lifted by suitable means engaged with the eye 30 on the end of the shaft thus disengaging the collar 27.

The more downward pressure there is on the shaft the more efficient the bearing will operate. It is thought that the construction, utility and advantages of this invention will now be quite apparent to those skilled in this art without a more detailed description.

It is preferable to provide a collar 31 on the lower portion of the shaft above the frame 9 so as to prevent the shaft 5 from falling all the way down to the bearing casing not being supported or should break loose from any ports provided therefor.

The present embodiment of the invention has been disclosed in detail merely for the purposes of exemplification since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention what I claim as new is:

1. In an assembly of the class described, a casing, a shaft extending through the casing vertically, said casing being provided with an annular flange about the shaft, a bearing member about the shaft having a hub about the shaft and within the flange, balls on the bearing member, a retainer for the ball, a sleeve about the shaft having an annular flange resting on the balls, an annular member about the shaft, means for anchoring the annular member in the casing, said annular member having an inwardly directed flange, balls resting on the inwardly directed flange, retaining means for said balls, a sleeve keyed to the upper end of the shaft and having notches formed therein said first sleeve and the projections receivable in said notches.

2. A bearing structure of the class described comprising a casing having an opening therethrough for receiving a vertical shaft, the bottom of the casing having an annular flange formed thereon about the opening, an annular bearing member having a hub receivable in the flange, balls resting on the member, retaining means for said balls, a sleeve receiving shaft having an outwardly directed annular flange resting on the ball, an annular bearing member disposed about the sleeve, bolts extending inwardly from the casing embedded therein and engaged with the last mentioned bearing member to center the same, and balls mounted in the last mentioned bearing member to engage the sleeve.

3. In an assembly of the class described, a casing, a shaft extending through the casing vertically, said casing being provided with an annular flange about the shaft, a bearing member about the shaft and having a hub about the shaft and within said flange, balls on the bearing member, a retainer for the balls, a sleeve about the shaft having an annular flange resting on the balls, a sleeve keyed to the upper end of the shaft and having notches formed therein, and the first mentioned sleeve having projections receivable in said notches.

In testimony whereof I affix my signature.

DORSEY E. WILKINSON.